US009058132B2

(12) United States Patent
Hadano

(10) Patent No.: US 9,058,132 B2
(45) Date of Patent: Jun. 16, 2015

(54) INFORMATION PROCESSING APPARATUS, CONTROL METHOD, AND COMPUTER-READABLE MEDIUM

(75) Inventor: Masahiro Hadano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 720 days.

(21) Appl. No.: 12/974,684

(22) Filed: Dec. 21, 2010

(65) Prior Publication Data

US 2011/0188065 A1  Aug. 4, 2011

(30) Foreign Application Priority Data

Feb. 4, 2010 (JP) ................................. 2010-023551

(51) Int. Cl.
G06F 3/12 (2006.01)
G06F 13/12 (2006.01)

(52) U.S. Cl.
CPC ....................................... G06F 3/12 (2013.01)

(58) Field of Classification Search
USPC .................... 358/1.13, 1.15; 710/62
See application file for complete search history.

(56) References Cited

U.S. PATENT DOCUMENTS

| 6,880,075 | B1 * | 4/2005 | Fukano et al. | 713/1 |
| 7,145,688 | B2 * | 12/2006 | Minagawa | 358/1.2 |
| 2005/0060649 | A1 * | 3/2005 | Kimura et al. | 715/526 |
| 2007/0268517 | A1 * | 11/2007 | Koarai | 358/1.15 |

FOREIGN PATENT DOCUMENTS

JP 2002-175164 A 6/2002

* cited by examiner

Primary Examiner — Ashish K Thomas
Assistant Examiner — Neil R McLean
(74) Attorney, Agent, or Firm — Fitzpatrick, Cella, Harper & Scinto

(57) ABSTRACT

An information processing apparatus in which a preset associated with a driver is registered, comprises a preset acquisition unit that acquires information regarding a preset registered in the information processing apparatus; a function acquisition unit that acquires information regarding a function of a printer that corresponds to a driver associated with the preset; a determination unit that compares information regarding a plurality of presets and determines whether or not the presets have the same parameter for a common setting item; and a registration unit that, if a function related to a setting item that is a difference included in only one of the presets is not held by a printer that corresponds to a driver associated with the other presets, registers only the preset including the setting item that is the difference in the information processing apparatus in association with a plurality of drivers associated with the plurality of presets.

7 Claims, 10 Drawing Sheets

FIG. 5

```
501 :   <CustomPresetsList>
502 :       <LastPresetInfo>
503 :           LastPreset    Standard
504 :       </LastPresetInfo>
505 :       <PresetSettings name="Standard">
506 :       </PresetSettings>
507 :       <PresetSettings name="Preset1">
508 :           ABC.ColorMode    Color
509 :           ABC.Duplex    Duplex
510 :           ABC.Resolution    600
511 :       </PresetSettings>
512 :   </CustomPresetsList>
```

FIG. 6A

|  | PRESET 1 | PRESET 2 | PRESET 3 |
|---|---|---|---|
| COLOR/MONOCHROME | COLOR | MONOCHROME | MONOCHROME |
| DUPLEX/SIMPLEX | DUPLEX | SIMPLEX | DUPLEX |
| N-up | 1-up | 2-up | 1-up |
| RESOLUTION | 600dpi | 600dpi | 1200dpi |

FIG. 6B

|  | PRESET 1 | PRESET 2 | PRESET 3 | PRESET 4 |
|---|---|---|---|---|
| COLOR/MONOCHROME | COLOR | MONOCHROME | MONOCHROME | COLOR |
| DUPLEX/SIMPLEX | DUPLEX | SIMPLEX | DUPLEX | DUPLEX |
| N-up | 1-up | 2-up | 1-up | 1-up |
| RESOLUTION | 600dpi | 600dpi | 1200dpi | 600dpi |

FIG. 9A

- 901
- 902 — PRINTER: 123.XXX.YYY.ZZZ
- 903 — PRESET: PRESET 1
- 904 — NUMBER OF COPIES: 1
- 905 — SHEET SIZE: A4
- 906 — FINISHING
- 907 — PRINTING METHOD: DUPLEX PRINTING
- 908 — PAPER EJECTION METHOD:
  - ☑ STAPLE
  - POSITION: UPPER LEFT
- 910 CANCEL
- 909 PRINT

FIG. 9B

- 1001
- 1002 — PRINTER: 123.XXX.YYY.ZZZ
- 1003 — PRESET: PRESET 1
- 1004 — NUMBER OF COPIES: 1
- 1005 — SHEET SIZE: A4
- 1006 — FINISHING
- 1007 — PRINTING METHOD: DUPLEX PRINTING
- 1009 CANCEL
- 1008 PRINT

INFORMATION PROCESSING APPARATUS, CONTROL METHOD, AND COMPUTER-READABLE MEDIUM

BACKGROUND OF THE INVENTION

1. Field of the Invention

The present invention relates to technology for managing information regarding drivers such as printer drivers.

2. Description of the Related Art

Conventionally, a preset that is a collection of several specified values for specified setting items can be stored corresponding to a printer driver in an information processing apparatus (see Japanese Patent Laid-Open No. 2002-175164, for example). In some information processing apparatuses, a preset suited for a printer corresponding to a driver can be registered when installing the driver in the information processing apparatus.

Also, depending on the operating system (hereinafter abbreviated as "OS") of an information processing apparatus, print settings are shared among a plurality of installed drivers. In an information processing apparatus with such an OS, the OS itself manages registered presets and, for example when a print request has been given, a preset corresponding to a driver selected first is reflected and a print setting screen is displayed. When the driver is switched to another driver thereafter, the settings displayed on the print setting screen for the previous driver before switching are shared with the driver after switching.

However, if a preset is registered in the information processing apparatus each time a driver is installed in the aforementioned case where the OS manages presets, there is the problem that similar presets are registered and thus overlap one another, for example when corresponding printers have similar functions. In this case, not only the storage area is used wastefully, but also preset management by the user is complicated.

SUMMARY OF THE INVENTION

According to one aspect of the present invention, there is provided an information processing apparatus in which a preset associated with an installed driver is registered, the apparatus comprising: a preset acquisition unit that acquires information regarding a preset registered in the information processing apparatus; a function acquisition unit that acquires information regarding a function of a printer that corresponds to a driver associated with the preset; a determination unit that compares information regarding a plurality of presets and determines whether or not the presets have the same parameter for a common setting item; and a registration unit that, for a plurality of presets that have been determined by the determination unit as having the same parameter for a common setting item, if a function related to a setting item that is a difference included in only one of the presets is not held by a printer that corresponds to a driver associated with the other presets as a result of reference to the function information acquired by the function acquisition unit, registers only the preset including the setting item that is the difference in the information processing apparatus in association with a plurality of drivers associated with the plurality of presets.

According to another aspect of the present invention, there is provided a control method for an information processing apparatus in which a preset associated with an installed driver is registered, the control method comprising: a preset acquisition step of, by a preset acquisition unit of the information processing apparatus, acquiring information regarding a preset registered in the information processing apparatus; a function acquisition step of, by a function acquisition unit of the information processing apparatus, acquiring information regarding a function of a printer that corresponds to a driver associated with the preset; and a determination step of, by a determination unit of the information processing apparatus, comparing information regarding a plurality of presets and determining whether or not the presets have the same parameter for a common setting item, wherein, for a plurality of presets that have been determined in the determination step as having the same parameter for a common setting item, if a function related to a setting item that is a difference included in only one of the presets is not held by a printer that corresponds to a driver associated with the other presets as a result of reference to the function information acquired in the function acquisition step, only the preset including the setting item that is the difference is registered in the information processing apparatus in association with a plurality of drivers associated with the plurality of presets.

According to the present invention, it is possible to avoid complicated preset management in an information processing apparatus because a plurality of presets having similar settings are not registered and thus do not overlap one another.

Further features of the present invention will become apparent from the following description of exemplary embodiments with reference to the attached drawings.

BRIEF DESCRIPTION OF THE DRAWINGS

FIG. 5 shows a file in which the setting content of presets is stored according to the embodiment of the present invention.

FIGS. 6A and 6B are diagrams illustrating a conventional preset addition method.

FIGS. 9A and 9B are diagrams showing a driver UI of a print queue using Preset 1 in FIGS. 8A and 8B.

DESCRIPTION OF THE EMBODIMENTS

First Embodiment
System Configuration

Figure 1:
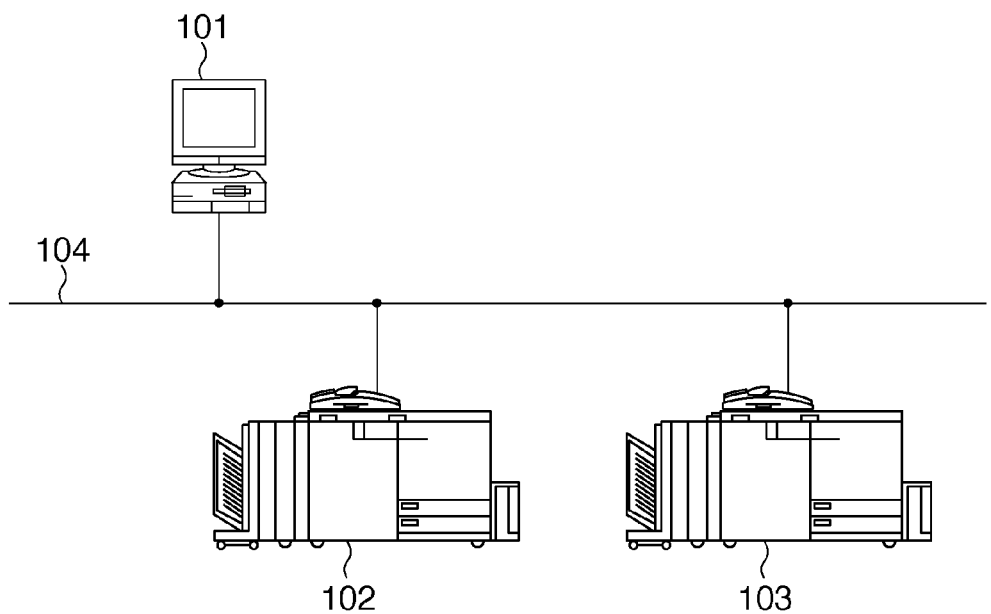
FIG. 1 is a diagram illustrating a printing system according to an embodiment of the present invention.

An embodiment for carrying out the present invention will be described hereinafter with reference to the drawings. FIG. 1 shows an example of a printing system to which the present invention is applied. In the printing system, a client computer 101 as an information processing apparatus and printers 102 and 103 are connected via a computer network 104. An operating system (hereinafter abbreviated as "OS"), applications, and printer drivers have been installed in the client computer 101. This system enables the user to transmit user data from the client computer 101 to the printer 102 or 103 and print the user data.

Figure 2:
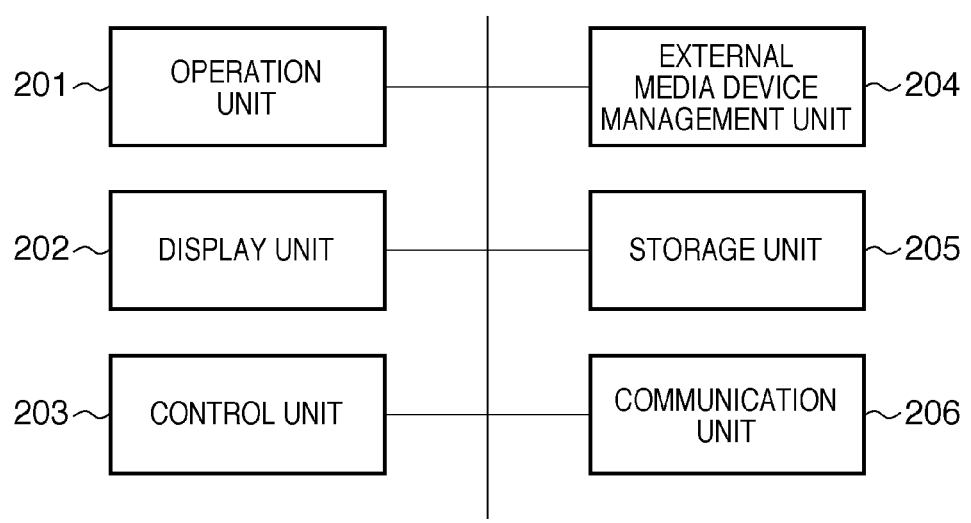
FIG. 2 is an internal block diagram of a client computer according to the embodiment of the present invention.

FIG. 2 is an internal block diagram of the client computer 101. The constituent elements of the client computer 101 include an operation unit 201, a display unit 202, a control unit 203, an external media device management unit 204, a storage unit 205, and a communication unit 206. The operation unit 201 is an interface for connecting a keyboard, a mouse, and the like. The display unit 202 is an interface for connecting a display device such as a display. The control unit 203 is a central processing unit (CPU). The external media device management unit 204 is an interface for connecting an external media device in order to load the OS, applications, printer drivers, and so on recorded on CDs or DVDs into the client computer 101. The storage unit 205 stores the OS, applications, printer drivers, print data, and so on. The communication unit 206 is an interface for communicating with the printer 102 and the like.

Module Configuration

Figure 3:
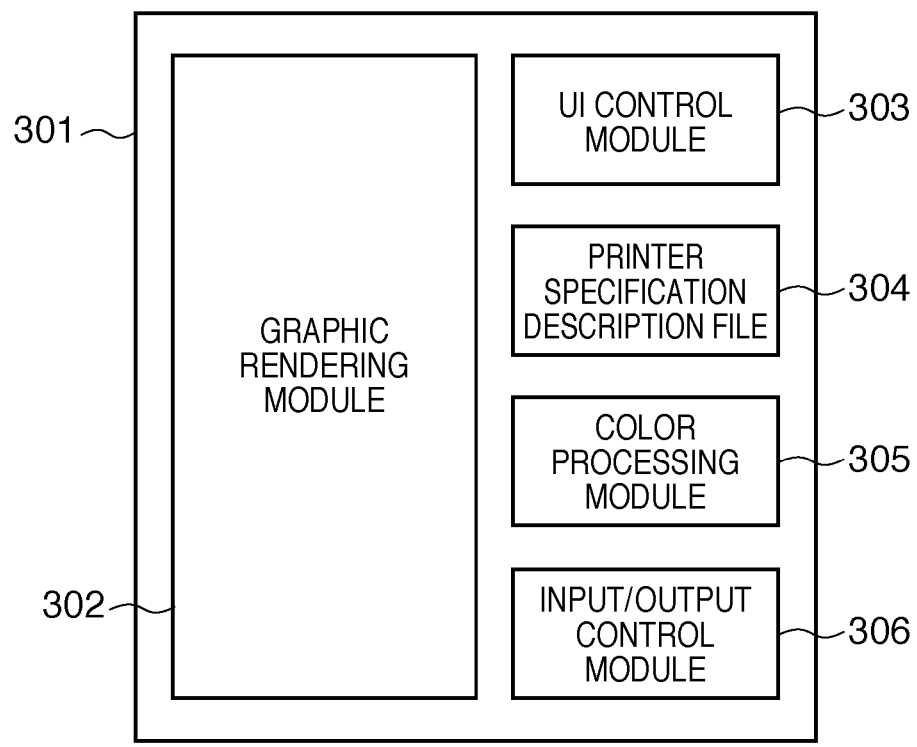
FIG. 3 is a module configuration diagram of a printer driver according to the embodiment of the present invention.

FIG. 3 is a module configuration diagram of a printer driver. A printer driver 301 includes a graphic rendering module 302, an UI control module 303, a printer specification description file 304, a color processing module 305, and an input/output control module 306. Note that other modules may be included depending on the function of the printer driver. There are several methods for creating this printer driver. For example, one method is to create the graphic rendering module 302 and the UI control module 303 so as to correspond to a plurality of printers, in order to support a plurality of printers with a single printer driver. Another method is to package the same number of printer specification description files as the number of supported printers with the printer driver. With such a method, the UI control module 303 displays and controls UIs in accordance with the printer specification description files 304. Also, the graphic rendering module 302 is configured to issue a page description language (PDL) and a printer control command in accordance with each printer.

A description is given of the procedure for installing a printer driver with such a configuration in the client computer 101. It is assumed herein that the user has prepared a CD-ROM in which the printer driver is stored or has got hold of a printer driver installer (not shown) via the network. In the below description, the printer driver installer is simply referred to as an installer for convenience sake. Initially, the user starts up the obtained installer. With this operation as a trigger, the installer stores a printer driver module at a predetermined location in the storage unit 205. The storage location varies depending on the printing system. As one example, in the CUPS (Common Unix Printing System), a printer driver module for each vendor is stored in the directory named /Library/Printers/.

Furthermore, printer drivers may be stored by type in the directory of each vendor. For example, in the case where a vendor called ABC has different printer drivers PDL1 and PDL2, the following directories may be created to store the printer drivers therein:

/Library/Printers/ABC/PDL1/
/Library/Printers/ABC/PDL2/

Although the installation of printer drivers has been completed with the above procedure, it is still necessary for the user to register printers using the printer drivers in order to actually output data to the printers. A printer to be registered in the system is hereinafter referred to as a "print queue" or simply as a "queue".

Printing System

Figure 4:
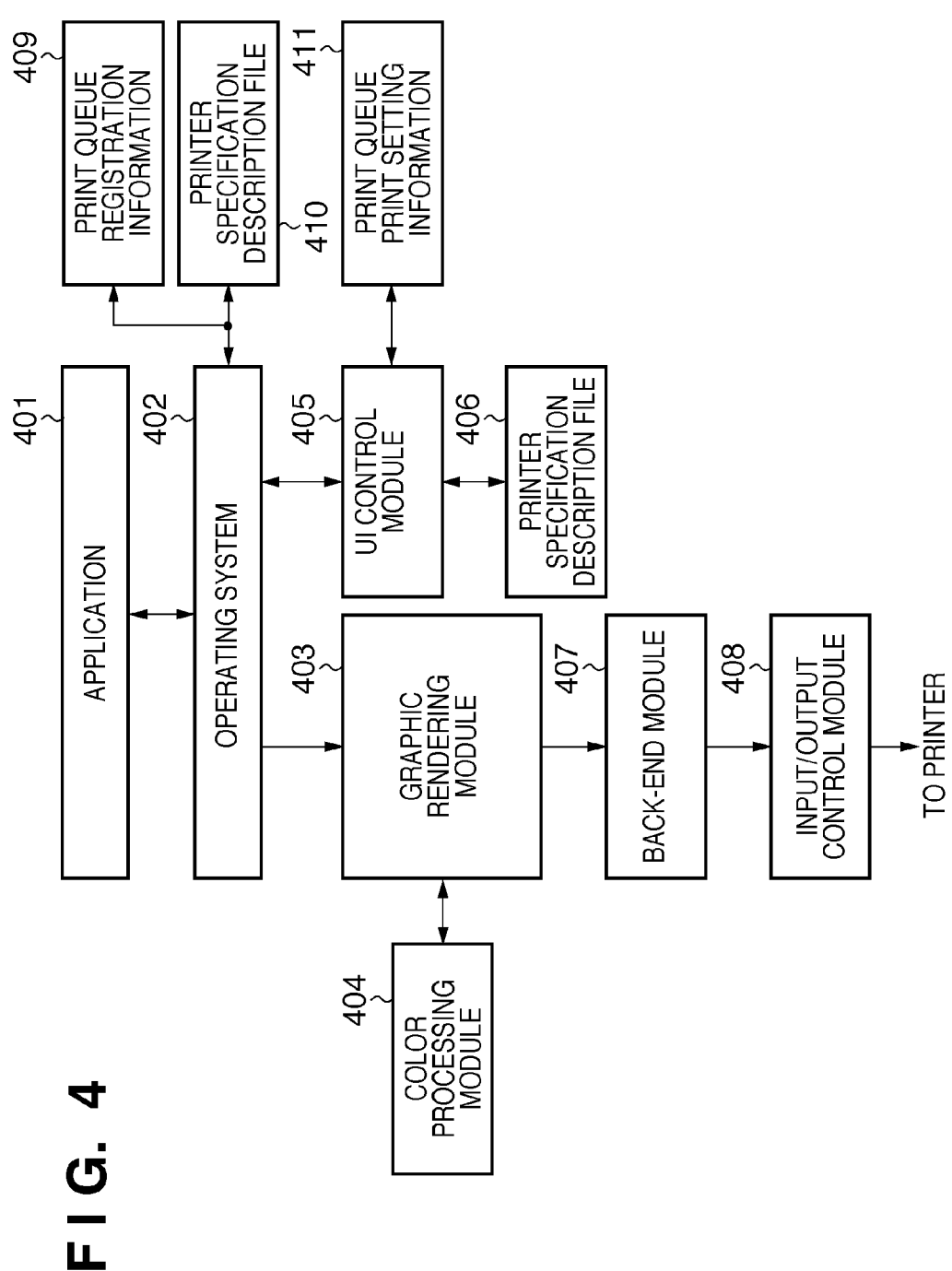
FIG. 4 is a block diagram of the printing system when registering a print queue according to the embodiment of the present invention.

The OS registers a user-specified print queue in the system. FIG. 4 is a block diagram of a printing system showing a state in which a printer driver has been installed and a print queue has been registered. In FIG. 4, a graphic rendering module 403 is the graphic rendering module 302 of the printer driver installed in a predetermined directory (/Library/Printers/) in the OS. Similarly, an UI control module 405 is the UI control module 303 of the installed printer driver.

A color processing module 404 is the color processing module 305 of the installed printer driver. An input/output control module 408 is the input/output control module 306 of the installed printer driver. A printer specification description file 406 is the printer specification description file 304 of the installed printer driver. Note that a back-end module 407 is a module that is provided by the OS for transferring print data generated by the graphic rendering module 403 to the input/output control module 408 for transferring the print data to a printer. The OS in the course of printer registration generates print queue registration information 409 and a printer specification description file 410. The print queue registration information 409 is a file in which information regarding a print queue to be registered is described. The printer name, the installation location, print-queue address information, and so on are described in the print queue registration information 409.

An OS 402 causes the UI control module 405 to display a printer addition dialog box (not shown) so as to collect print queue print setting information 411 and generate the print queue registration information 409. For example, in the CUPS system, a printers.conf file stored in the directory /etc/cups/ corresponds to the print queue registration information 409. Meanwhile, functional specifications of the printer are described in the printer specification description file 410.

The OS 402 acquires the printer specification description file 406 corresponding to the printer from the UI control module 405 and stores this file at a predetermined location in the system. The storage location is, for example, a directory of the storage unit 205 named "/etc/cups/ppd/" in the CUPS system. In FIG. 4, the OS 402 stores the printer specification description file 406 in the printer specification description file 410. When switching the output destination printer to another printer, the user selects a print queue in a print-queue selection dialog box (not shown) displayed by the UI control module 405.

Storage of Preset

FIG. 5 shows a file in which the setting content of presets is stored. The term "preset" as used herein refers to a combination of print settings that the user uses at frequent intervals and that is identified and stored by name. In a case of using the settings, the user can reproduce the settings by selecting a desired preset from among stored presets in a preset selection dialog box (not shown) displayed by the UI control module 405. Below is a description of the setting and storage of presets.

A preset to be newly registered is installed in the OS by an installer when a printer driver is installed. In FIG. 5, the setting content of a plurality of presets is described in the <CustomPresetList> tag on lines 501 to 512. A single preset is described in the <PresetSettings> tag as described on lines 505 and 506. It is assumed here that the preset name is described as a parameter of the <PresetSettings> tag. The preset described on lines 505 and 506 indicates that the preset name is "Standard" and the setting content of the preset is Null.

In the preset setting content storage file shown in FIG. 5, another preset named "Preset1" is described on lines 507 to 511. The setting content of this preset is described from lines 508 to 510. Line 508 shows that the parameter of "Color-Mode" is "Color", line 509 shows that the parameter of "Duplex" is "Duplex", and line 510 shows that the parameter of "Resolution" is "600". Note that the identifier "ABC." is attached to the head of each item, and this is in order to distinguish the setting items of each vendor because presets are managed by the OS and commonly used by vendors. As described above, the type and setting content of each preset can be defined in the preset setting content storage file.

FIGS. 6A and 6B are diagrams for illustrating a conventional method for adding a preset during installation of a printer driver.

FIG. 6A is a diagram showing the states of registered presets before another preset has been added.

Preset 601 represents the name of a registered preset. In FIG. 6A, three presets, namely, Preset 1, Preset 2, and Preset 3, have been registered. Setting 602 represents the setting content of a preset. The setting content in FIGS. 6A and 6B includes color/monochrome, duplex/simplex, N-up, and resolution. For example, Preset 1 has a combination of the following settings: color, duplex, 1-up, and 600 dpi.

FIG. 6B is a diagram showing the states of registered presets after another preset has been added during installation of a printer driver. Preset 603 represents the name of a registered preset. Setting 604 represents the setting content of a preset. In FIG. 6B, Preset 4 has been added. In the conventional preset addition method, although Preset 4 has the same setting content as Preset 1, it has been added as a new preset and thus overlaps with Preset 1.

Figure 7A:
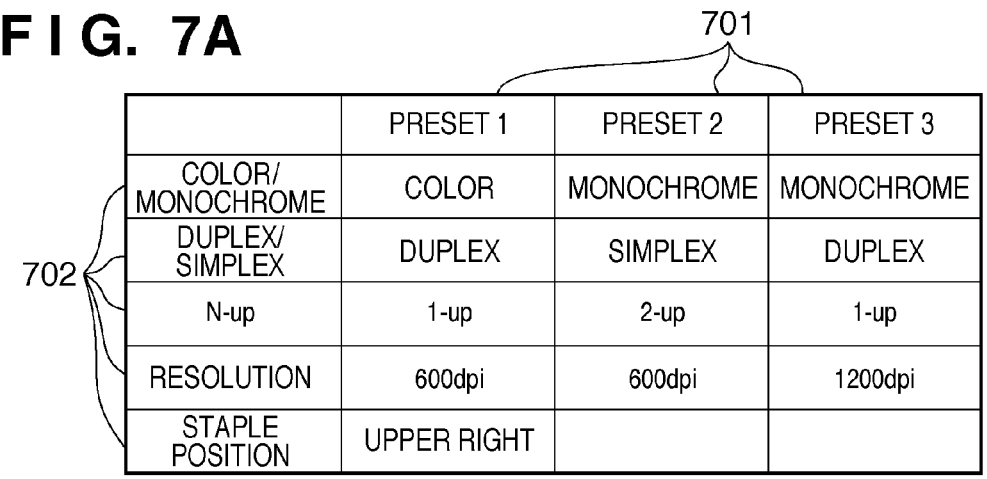
FIGS. 7A and 7B are diagrams illustrating another conventional preset addition method.
Figure 7B:
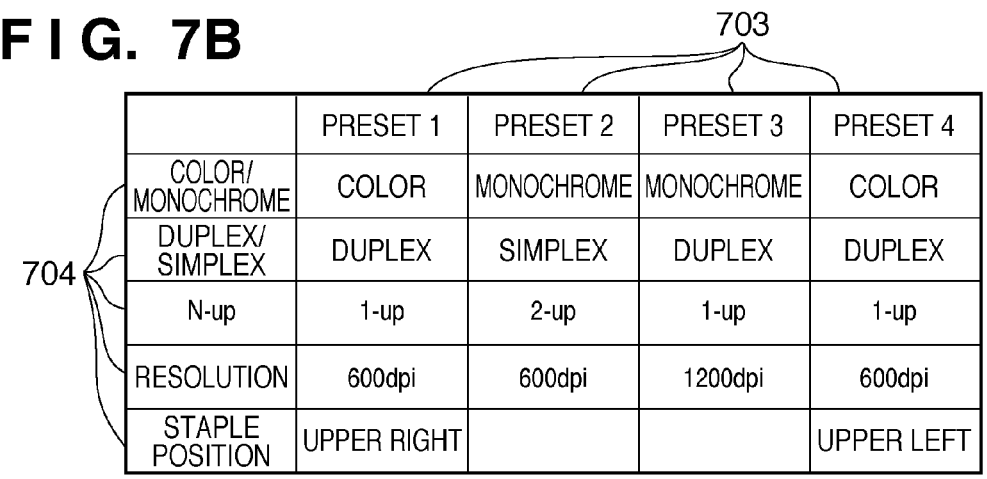

FIGS. 7A and 7B are diagrams for illustrating another conventional method for adding a preset during installation of a printer driver. FIGS. 7A and 7B show a different example from that shown in FIGS. 6A and 6B.

FIG. 7A is a diagram showing the states of registered presets before another preset has been added. Preset 701 represents the name of a registered preset. In FIG. 7A, three presets, namely, Preset 1, Preset 2, and Preset 3, have been registered. Setting 702 represents the setting content of a preset. The setting content to be registered in FIGS. 7A and 7B includes color/monochrome, duplex/simplex, N-up, resolution, and staple position. For example, Preset 1 has a combination of the following settings: color, duplex, 1-up, 600 dpi, and upper right. Since Presets 2 and 3 do not include a staple function, nothing is set to the staple position.

FIG. 7B is a diagram showing the states of registered presets after another preset has been added during installation of a printer driver. Preset 703 represents the name of a registered preset. Setting 704 represents the setting content of a preset. In FIG. 7B, Preset 4 has been added. Even if the settings of Preset 4 are approximately the same as the settings of Preset 1 but differ only in part (the parameter of the staple position setting), Preset 1 is not edited because of the presence of a print queue using Preset 1. Preset 4 has thus been added as a new preset.

Specifically, in the conventional preset addition methods shown as examples in FIGS. 6A and 6B and FIGS. 7A and 7B, a preset that is similar to an already-registered preset is added as a new preset.

Addition of Preset

Figure 8A:
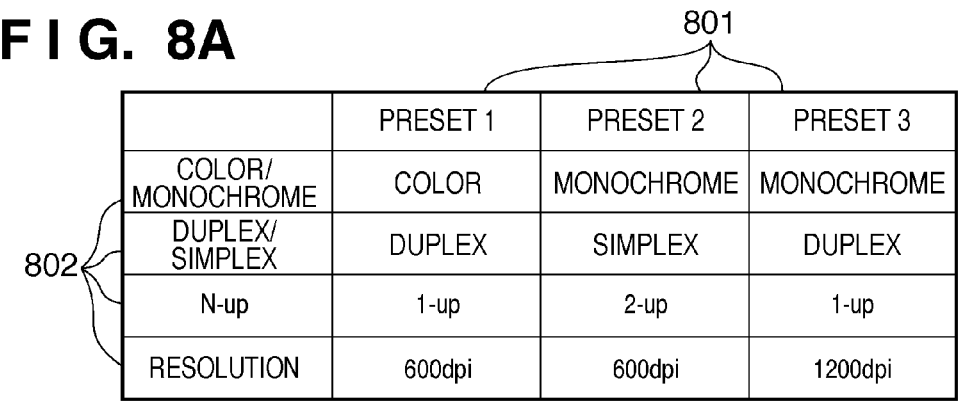
FIGS. 8A and 8B are diagrams illustrating a preset addition method according to the embodiment of the present invention.
Figure 8B:
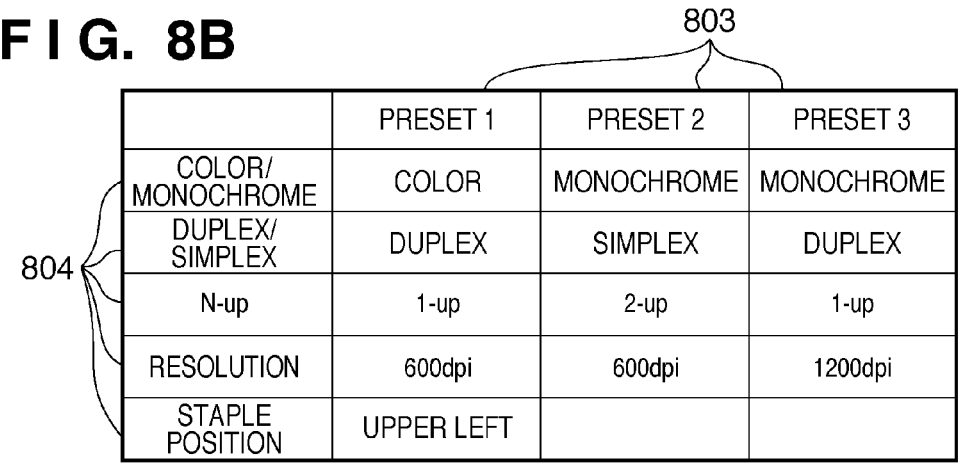

FIGS. 8A and 8B are diagrams for illustrating a method for adding a preset during installation of a printer driver according to the present embodiment.

FIG. 8A is a diagram showing the states of registered presets before another preset has been added. Preset 801 represents the name of a registered preset. In FIG. 8A, three presets, namely, Preset 1, Preset 2, and Preset 3, have been registered. Setting 802 represents the setting content of a preset. The setting content in FIG. 8A includes color/monochrome, duplex/simplex, N-up, and resolution. For example, Preset 1 has a combination of the following settings: color, duplex, 1-up, and 600 dpi.

It is assumed here to newly add a preset (Preset 4) that has, as parameters of the setting items, a combination of the following settings: color, duplex, 1-up, 600 dpi, and upper left.

FIG. 8B is a diagram showing the states of registered presets after the aforementioned preset has been added during installation of a printer driver. Preset 803 represents the name of a registered preset. In the present embodiment, unlike in the example of FIG. 7B, if a specified condition is satisfied, Preset 4 above is not added as a new preset. In the present example, registration is made by adding the setting content that is unique to a new preset or Preset 4 to Preset 1 whose settings overlap with the settings of the new preset.

Figure 10:
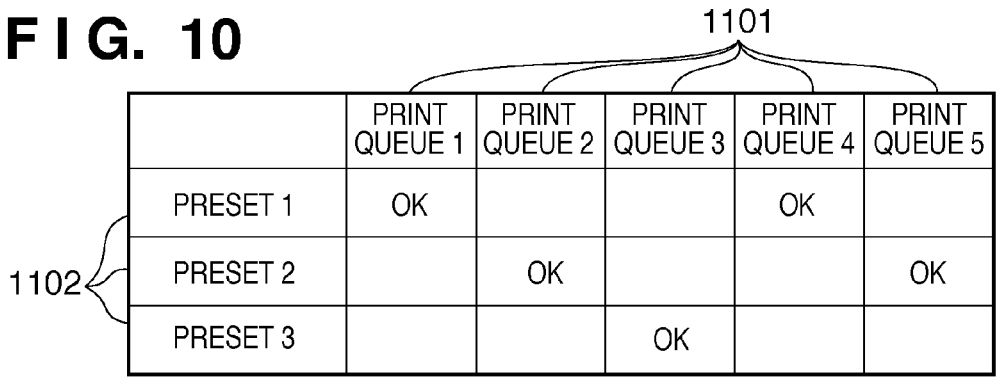
FIG. 10 is a table showing the relation between presets and print queues according to the embodiment of the present invention.

A description is given of a specific example of such a specified condition. An installer (not shown) confirms that a printer (here, the printer 102) corresponding to a print queue using Preset 1 does not have a different function (staple function) that is included in Preset 4 to be added but is not included in Preset 1. Here, the function of the printer 102 is confirmed by reference to the printer specification description file 410. As a result, if the installer has confirmed that the printer 102 using Preset 1 in FIG. 8A does not have a staple function and furthermore the other settings of Preset 1 are the same as the settings of Preset 4, the staple position setting, specifically "upper left", is added to Preset 1. At this time, the print queue using Preset 4 is associated with Preset 1 as shown in FIG. 10 discussed later.

In the case where the user selects a print queue corresponding to the printer 102 and uses Preset 1 updated as above for printing, the staple position setting is not reflected because the printer 102 does not have a staple function. Meanwhile, printers corresponding to print queues using Preset 4 have a staple function and therefore, if Preset 1 updated as above is used likewise, all settings included in Preset 1, including the staple position setting, are to be reflected.

Specifically, in the example of adding a new preset shown in FIGS. 8A and 8B according to the present embodiment, a plurality of presets are collectively managed under a specified condition rather than indiscriminately registering a new preset as shown in FIGS. 6A and 6B and FIGS. 7A and 7B. Note that, other than the aforementioned case, an example of the specified condition includes the case where presets are collectively managed as a single preset when the parameters of all setting items included in those presets overlap one another.

The above description has been given on the assumption that a preset is updated by an installer at a time when a new driver has been installed. However, similar effects can also be achieved even if the aforementioned processing for updating a preset is performed at desired times such as when a module provided by for example a driver or the OS has newly registered only a preset, or at start-up of a program.

FIG. 9A shows a driver UI of a print queue using Preset 1 in FIG. 8B. The print queue in this case is a printer that has a staple function and whose functional content corresponds to Preset 1. A print setting dialog box 901 is a user interface that enables the user to change print settings used for actual printing, for example. The print setting dialog box 901 includes print queue selection 902, preset selection 903, number of copies 904, and sheet size 905 as common controls provided by the system. When changing the output destination printer, the user operates the print queue selection 902. Functions that are unique to the printer can be set using other areas.

When a printer has a large number of functions, a method is adopted in which, instead of displaying all functions at a time, function groups are switched using control 906. One example is shown here in which the functions related to "finishing" are displayed. The functions related to "finishing" include the designation of either simplex or duplex using printing method 907 and the setting of the staple position using paper ejection method 908. N-up can be designated as a layout function by enabling selection of "layout" with control 906 (not shown). A print button 909 is a button for executing printing, and a cancel button 910 is a button for cancelling printing.

FIG. 9B is a driver UI of a print queue using Preset 1 in FIG. 8A. Preset 1 here does not include a staple function. A print setting dialog box 1001 includes print queue selection 1002, preset selection 1003, number of copies 1004, and sheet size 1005 as common controls provided by the system. Functions that are unique to the printer include the switching of function groups using control 1006 and the designation of either simplex or duplex using printing method 1007. A print button 1008 is a button for executing printing, and a cancel button 1009 is a button for cancelling printing. A similar driver UI is also used in the case where the printer 102 that does not have a staple function uses Preset 1 in FIG. 8B. Note that the UI configurations shown in FIGS. 9A and 9B are merely examples and therefore the UI configuration is not limited to these as long as items necessary to set a preset are included.

Relation Table Between Preset and Print Queue

FIG. 10 is a table showing the relation between presets and print queues. This table includes two items, namely print queue 1101 and preset 1102. According to this table, Preset 1 is used by not only a print queue 1 but also a print queue 4. Similarly, Preset 2 is used by print queues 2 and 5. In this way, a single preset may be used by a plurality of print queues in the present embodiment.

Figure 11A:
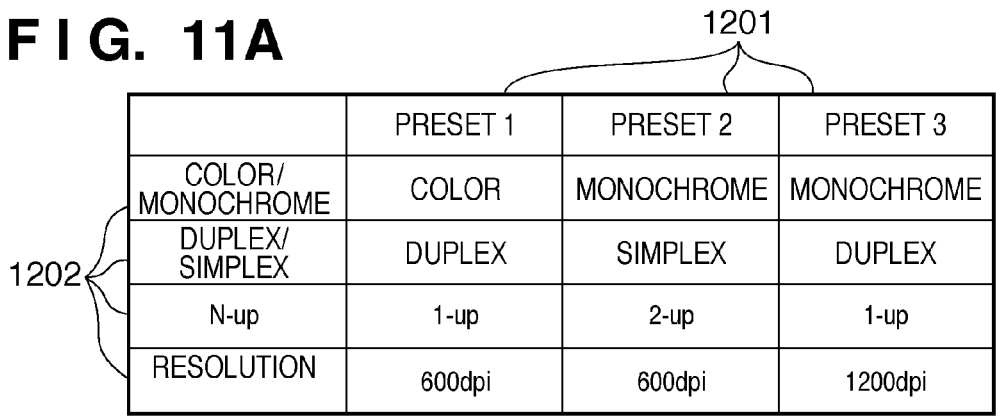
FIGS. 11A and 11B are tables showing that a plurality of functions are added to preset according to the embodiment of the present invention.
Figure 11B:
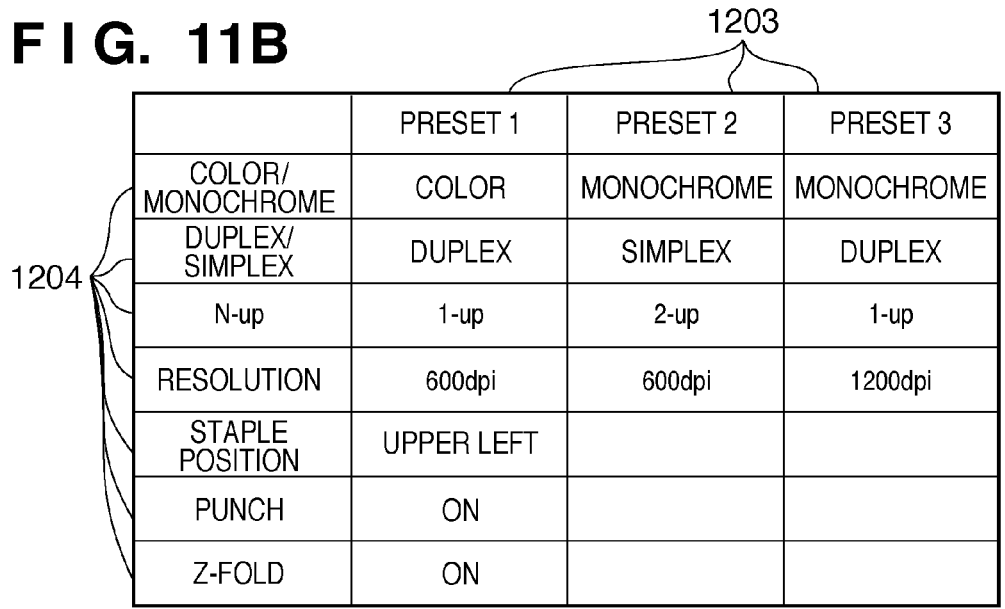

FIGS. 11A and 11B show that a plurality of functions can be added to a preset during installation of a printer driver. FIG. 11A is the same as FIG. 8A. Preset 1201 represents the name of a registered preset. Setting 1202 represents the setting content of a preset. Like FIG. 8B, FIG. 11B shows the state after functions have been added to Preset 1. The difference of FIG. 11B from FIG. 8B is that a plurality of functions have been added to a single preset. An installer confirms that a printer (here, the printer 102) corresponding to a print queue using Preset 1 does not have a different function that is included in a preset to be added but is not included in Preset 1. The functions of the printer 102 are confirmed by reference to the printer specification description file 410. As a result, if the installer has confirmed that the printer 102 using Preset 1 shown in FIG. 11A does not have staple, punch, and Z-fold functions, the installer adds the staple (upper left), punch, and Z-fold functions (setting items) to Preset 1. Since the printer 102 does not have those functions, a print queue corresponding to the printer 102 is not affected even if the staple (upper left), punch, and Z-fold functions have been added to Preset 1.

Procedure of Driver Installation

Figure 12A:
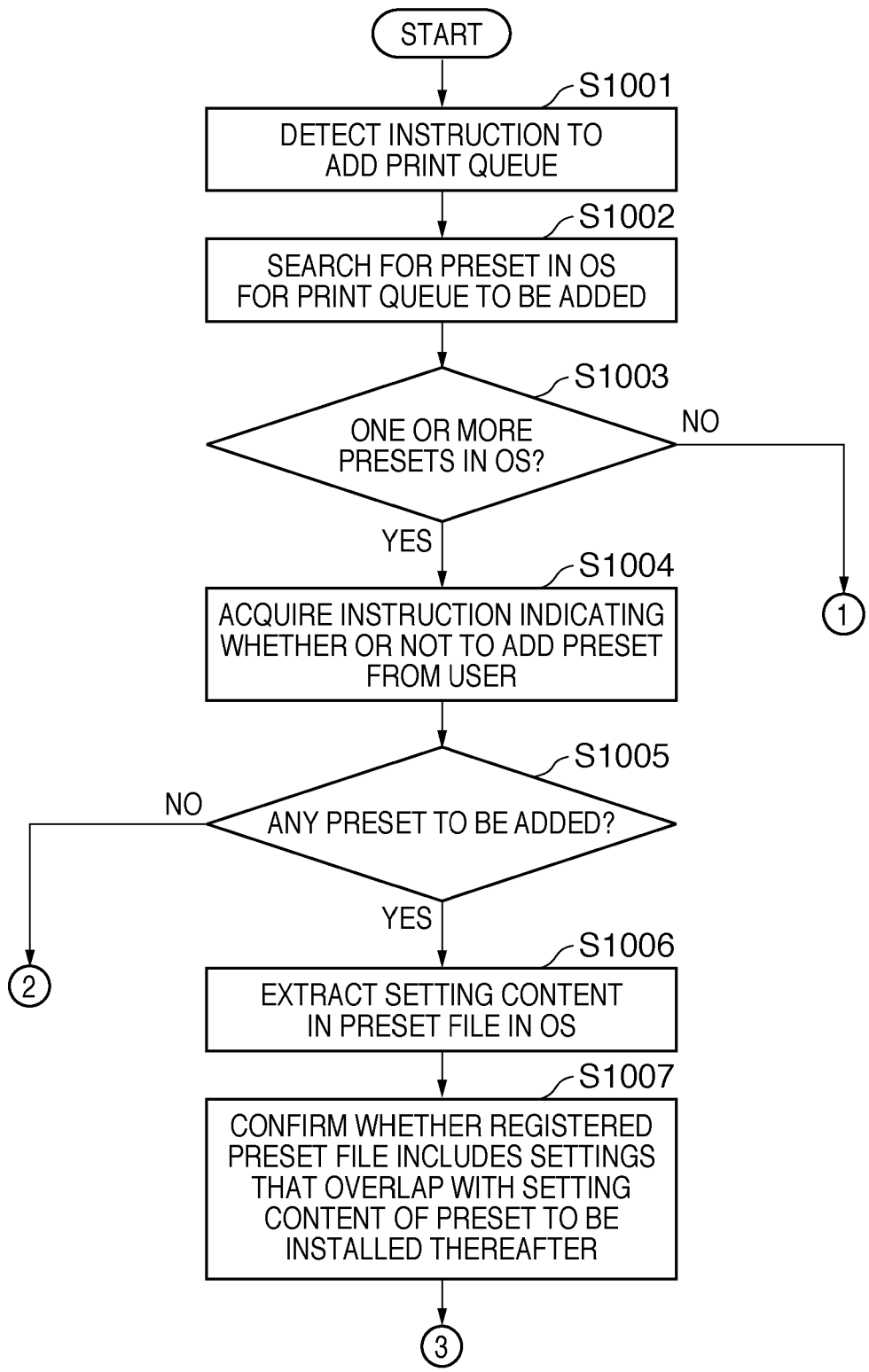
FIGS. 12A and 12B are flowcharts of installation by an installer according to the embodiment of the present invention.
Figure 12B:
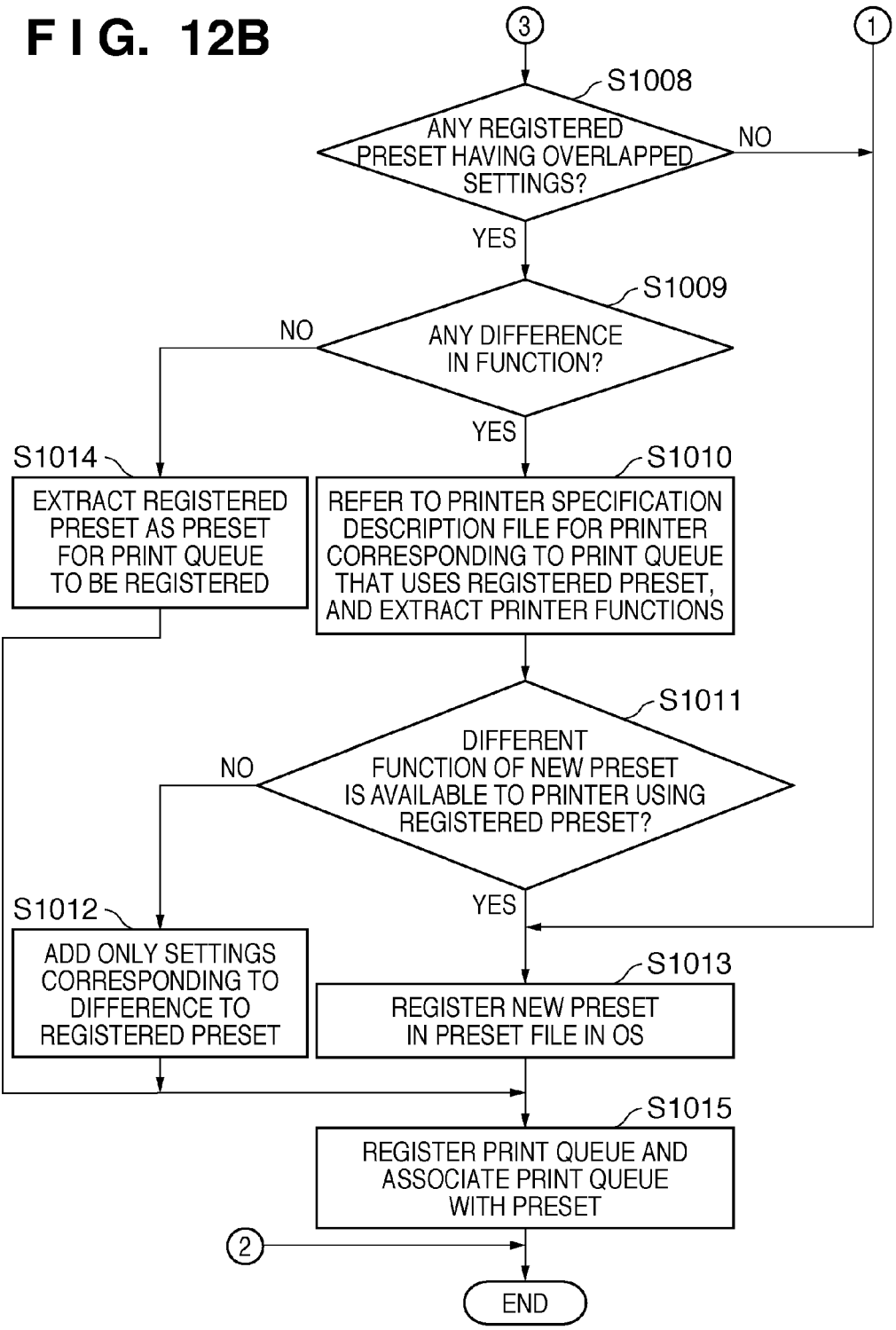

FIGS. 12A and 12B are flowcharts illustrating processing for installing a printer driver with an installer. An installer stored in the client computer 101 is started up. The installer installs a printer driver and also attempts to newly install a preset customized by a vendor for a supported printer. Then, processing is started upon display of a printer driver installation screen (not shown).

In step S1001, the installer detects an instruction to add a print queue. In step S1002, the installer searches for a preset in the OS for the print queue to be added. In step S1003, the installer determines whether or not one or more such presets exist in the OS. If one or more such presets exist in the OS, the procedure proceeds to step S1004. If there is no such a preset, the procedure proceeds to step S1013.

In step S1004, the installer acquires an instruction indicating whether or not to add a preset from the user. In step S1005, the installer determines whether or not to add a preset. If a preset is to be added, the procedure proceeds to step S1006. Otherwise, the installation of the printer driver ends without adding a preset.

In step S1006, the installer extracts the setting content of presets managed by the OS. This is implementation of a preset acquisition step of acquiring information regarding presets. In step S1007, the installer confirms whether or not the file of registered presets managed by the OS includes settings that overlap with the setting content of the preset to be installed thereafter.

In step S1008, the installer determines whether or not there is a registered preset whose settings overlap with the settings of the preset to be installed. Here, if the two presets to be compared have the same parameters for all common setting items, they are determined as overlapping each other. If the installer has determined in step S1008 that there is a registered preset that has overlapped settings, the procedure proceeds to step S1009. If it has been determined that there is no such a registered preset, the procedure proceeds to step S1013.

In step S1009, the installer determines whether or not there is a difference in specified functions (setting items) between the registered preset determined as having overlapped settings and the new preset to be installed. If there is a difference in function, the procedure proceeds to step S1010, and if there is no difference in function, the procedure proceeds to step S1014.

If there is a different function in step S1009, the installer refers to the printer specification description file 410 for a printer corresponding to a print queue that uses the registered preset, and extracts printer functions in step S1010. This is implementation of a function acquisition step of acquiring information regarding printer functions. In step S1011, the installer determines whether or not the function of the new preset to be installed different from that of the registered preset is a function available to a printer using the registered preset. As shown in FIG. 10, the registered preset may be used by a plurality of printers. If the different function of the new preset to be installed is not available to any of such printers, the procedure proceeds to step S1012. If there is a possibility that the different function be available to any of such printers, the procedure proceeds to step S1013.

In step S1012, the installer adds the setting of the different function to the registered preset. This corresponds to the processing for adding the staple position setting (whose parameter is "upper left") to Preset 1 in FIG. 8B. Accordingly, a plurality of similar presets can be managed efficiently as a single preset without those presets being registered as-is in the OS. In step S1013, the installer registers the new preset as a preset to be managed by the OS. This is similar to the processing for registering a preset (additional registration) as shown in FIGS. 6A, 6B, 7A, and 7B. After the installer has executed the processing of step S1012 or S1013, the procedure proceeds to step S1015.

If there is no difference in function in step S1009, it indicates that all setting items and their parameters are the same between the registered preset and the preset to be installed. Accordingly, the installer extracts the registered preset as a preset for a print queue to be newly registered in step S1014. This prevents a plurality of presets having the same setting content from being registered in the OS. After the execution of the processing of step S1014, the procedure proceeds to step S1015.

In step S1015, the installer registers a print queue and associates the print queue with the preset as shown in FIG. 10, and thereafter the procedure ends.

Alternatively, such a procedure is possible in which when the user has given an instruction to add a preset in step S1004, whether to additionally register all new presets to be installed or to add only differences may be selected. Still alternatively, whether to add only differences, that is, overwrite a registered preset or to additionally register a new preset may be selected for each new preset to be registered.

Also, although not shown in the flowchart of FIGS. 12A and 12B, the user may be notified of registration content when a new preset is registered, irrespective of whether overwritten registration or additional registration. Furthermore, when a preset has been newly added, the user may be allowed to change or newly define the name of the registered preset, irrespective of whether overwritten registration or additional registration. Also, the names of a plurality of corresponding print queues may be automatically set depending on the preset name and attribute information. In such a case, as one example, screen data to be input may be provided by the UI control module 303.

The above description thus shows that it is possible to prevent a plurality of presets having the same setting content from being registered in the OS during installation of a driver. It is also possible to prevent a large number of presets having approximately the overlapped setting content from being registered unconditionally. This reduces the burdens of managing and grasping presets on users and accordingly improves the convenience of users.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-023551, filed Feb. 4, 2010, which is hereby incorporated by reference herein in its entirety.

What is claimed is:

1. An information processing apparatus in which a preset associated with an installed driver is registered, the apparatus comprising:

a detection unit that detects an instruction of registration of a new preset;

a preset acquisition unit that acquires information regarding a preset registered in the information processing apparatus from management information for managing the registered preset and a first print queue associated with the registered preset;

a determination unit that compares information regarding the new preset with the information regarding the registered preset acquired by the preset acquisition unit and determines whether or not the new preset and the registered preset have the same parameter for a common setting item; and a control unit that controls the registration of the new preset in the information processing apparatus according to a result of the determination, wherein, if the determination unit determines that the new preset and the registered preset do not have the same parameter for the common setting item, the control unit registers, in the information processing apparatus, the new preset which is associated with a second queue, and wherein, if the determination unit determines that the new preset and the registered preset have the same parameter for the common setting item, the control unit updates the registered preset by adding, to the registered preset, a setting item that is a difference included in the new preset and a parameter of the setting item, and the updated preset is also associated with the second queue in addition to the first print queue, without the registration of the new preset.

2. A control method for an information processing apparatus in which a preset associated with an installed driver is registered, the control method comprising:

a detection step of detecting an instruction of registration of a new preset;

a preset acquisition step of acquiring information regarding a preset registered in the information processing apparatus from management information for managing the registered preset and a first print queue associated with the registered preset;

a determination step of comparing information regarding the new preset with the information regarding the registered preset acquired by the preset acquisition unit and determining whether or not the new preset and the registered preset have the same parameter for a common setting item; and a control step of controlling the registration of the new preset in the information processing apparatus according to a result of the determination, wherein, in the control step, if it is determined in the determination step, that the new preset and the registered preset do not have the same parameter for the common setting item, the new preset, which is associated with a second queue, is registered in the information processing apparatus, and wherein, in the control step, if it is determined in the determination step that the new preset and the registered preset have the same parameter for the common setting item, the registered preset is updated by adding, to the registered preset, a setting item that is a difference included in the new preset and a parameter of the setting item, and the updated preset is also associated with the second queue in addition to the first print queue, without the registration of the new preset.

3. The control method according to claim 2, wherein in a case where a new preset is registered, if no preset has been registered in the information processing apparatus, the new preset is registered in the information processing apparatus.

4. The control method according to claim 2, further comprising:
   a notification step of notifying a user of registration content when a preset is registered in the information processing apparatus.

5. The control method according to claim 2, further comprising:
   a selection step of accepting selection of whether to update the registered preset or to additionally register the new preset without updating when the new preset is registered.

6. The control method according to claim 2, further comprising:
   a changing step of changing the name of the registered preset when the registered preset is updated.

7. A non-transitory computer-readable medium storing a program for causing a computer to execute the control method according to claim 2.

* * * * *